United States Patent [19]

Hinds

[11] Patent Number: 5,763,966
[45] Date of Patent: *Jun. 9, 1998

[54] SINGLE PLANE MOTOR SYSTEM GENERATING ORTHOGONAL MOVEMENT

[76] Inventor: Walter E. Hinds, 1358 Schuyler, Beverly Hills, Calif. 90210

[21] Appl. No.: 852,190

[22] Filed: May 6, 1997

[*] Notice: The term of this patent shall not extend beyond the expiration date of Pat. No. 5,648,690.

Related U.S. Application Data

[63] Continuation-in-part of Ser. No. 404,349, Mar. 15, 1995, Pat. No. 5,648,690.

[51] Int. Cl.$^6$ ............................................. F16M 11/12
[52] U.S. Cl. ..................... 310/12; 74/480 R; 248/178.1
[58] Field of Search ................... 310/12, 112; 318/135; 74/479.01, 480 R; 108/137, 143; 248/178.1

[56] References Cited

U.S. PATENT DOCUMENTS

| | | | |
|---|---|---|---|
| 3,376,578 | 4/1968 | Sawyer | 346/29 |
| 3,857,078 | 12/1974 | Sawyer | 318/608 |
| 4,560,911 | 12/1985 | Chitayat | 318/135 |
| 4,654,571 | 3/1987 | Hinds | 318/687 |
| 4,761,573 | 8/1988 | Chitayat | 310/12 |
| 4,808,892 | 2/1989 | Dreibelbis | 318/135 |
| 4,985,651 | 1/1991 | Chitayat | 310/12 |
| 5,216,932 | 6/1993 | Takei | 74/479 R |
| 5,341,700 | 8/1994 | Speranza et al. | 74/490.13 |
| 5,405,222 | 4/1995 | Ward | 409/201 |
| 5,523,941 | 6/1996 | Burton et al. | 364/167.01 |

Primary Examiner—Steven L. Stephan
Assistant Examiner—Judson H. Jones
Attorney, Agent, or Firm—Merchant, Gould, Smith, Edell, Welter & Schmidt

[57] ABSTRACT

A linear motor system for providing XY motion comprises a first linear motor directed for effecting movement of a first element in a first of two orthogonal directions. There is a second linear motor directed for effecting movement of a second element in a second of the orthogonal directions. The motors are mounted on a base such that the elements are located and movable in a single plane in the respective orthogonal directions relative to each other over the base. A shuttle is reactive with the two elements such that movement of the elements effects XY movement of the shuttle. The elements and the shuttle are connected through a bearing force. The bearing force is created selectively by a vacuum attracting force cooperating with an air bearing repelling force, a magnetic attracting force cooperating with an air bearing repelling force, an air bearing repelling force in a first direction and an air bearing repelling force in an opposite direction, or a mechanical linkage. There is very fine movement in an XY direction which can be precisely controlled while angular movement of the shuttle is prevented.

24 Claims, 9 Drawing Sheets

SINGLE PLANE MOTOR SYSTEM GENERATING ORTHOGONAL MOVEMENT

RELATED APPLICATION

This application relates to, and is a continuation-in-part of, application Ser. No. 08/404,349 filed Mar. 15, 1995, Pat. No. 5,648,690 and entitled MOTOR SYSTEM OR GENERATING ORTHOGONAL MOVEMENT IN A SINGLE PLANE. The contents thereof are incorporated by reference herein.

BACKGROUND

Providing a motor system operational in a single plane and capable of fine controllable movement in the XY plane is highly desirable.

This invention relates to motors for effecting movement in an XY plane. In particular, the invention is directed to a system of linear motors operating such that control of movement of a shuttle in the plane can be finely regulated, and wherein the angular movement can be restrained.

Modern technology requires a system where a shuttle can move in a XY plane, and wherein the profile of the motor system and shuttle is maintained relatively low. As such, a workpiece can be located on the shuttle which is located on a table so that it is mounted strategically relative to different tools or other elements. Work can then be conducted on workpieces or components on the table as required.

As components have grown smaller in size, it is necessary to be able to locate tools and the like more precisely relative to the workpiece along XY coordinates. Operations need to be effected on the component within an accuracy of one tenth of a thousandth of an inch of accuracy, or even closer tolerances.

It is known to locate two linear motors orthogonally relative to each other in a piggy-back relationship. U.S. Pat. No. 4,808,892 (Dreibelbis). These motors operate in two different planes, namely a compound or multi-planar relationship. The difficulty with this configuration is the height of the structure. Such multi-plane systems operate with DC motors such that accurate movement in each orthogonal direction can be controlled. The multi-planar configuration, namely the height of the system, however, is a disadvantage in the overall construction of apparatus operating in an XY plane.

It is known to have linear stepper motors operate in a single plane such that a platen, shuttle or the motor itself can move in the XY plane. U.S. Pat. Nos. 3,376,578 and 3,857,078 (Sawyer). As part of this system, linear stepper motors are incorporated in the shuttle which moves over a waffle surface. A disadvantage of such a system is that the waffle surface which is used for interaction with the motor has discrete magnetic elements in the form of pinhead elements arranged on the base about which the platen, shuttle or motor unit moves. The pinhead elements cannot be reduced beyond a predetermined size. The motor movement across the base is thus effected in steps greater than several thousandths of an inch. Such accuracy is not adequate in many applications requiring finer motion control with modern technology applications. As a consequence, such stepper motor operation has its limitations in fine movement control.

The typical pitch of the surface as defined by the pinhead is about 0.04 inch. Each pulse of power causes a stepper linear motor which is part of the shuttle system to move in a microstep manner such that the motion of each step is in the order of 0.01 inch for a two-phase motor or 0.005 inch for a four-phase motor. This is insufficiently fine control for modern technology needs.

This relative inaccuracy is further aggravated in that where there is an open loop system with such linear stepper motors there is the possibility that the motor will go out of synchronization and lose position.

Another manner of regulating movement in a single plane is effected by a DC motor movable over a checkerboard plane of different magnetic fields. Such a system is disclosed in U.S. Pat. No. 4,654,571, by the present applicant (Hinds). Such a system requires complex laser beam and laser interferometer detection means for regulating movement of the shuttle over the plane.

Linear DC motors having feedback means are well-known. U.S. Pat. Nos. 4,560,911 and 4,761,573 (Chitayat) describe such motors. The feedback means can facilitate very accurate control of movement of a table, platen or the like in a single direction.

It is unknown to provide a system of linear motors whereby a platen, table or shuttle can be moved in more than one direction, namely an XY direction, which is a compound orthogonal direction with the same degree of accuracy as movement of the shuttle in a single direction. There is a need for having a motor system providing for accurate XY movement, which has a relatively low profile, and which has the ability to be restrained in angular movement.

SUMMARY

By this invention there is provided a motor system minimizing the drawbacks of known motor systems having mobility in an XY direction.

There are means for coupling two single-axis linear motors arranged in a single plane to a shuttle so that movement can be effected of the shuttle in a single plane in two dimensions. This permits a low profile configuration. Means is provided for movement of a shuttle, platen, stage or table in an XY direction with fine movement which is controllable to substantially the same extent as movement is controllable in a single direction with a linear motor operating with feedback.

The XY motion is a combination of X and Y motion, and the first orthogonal direction can be the X direction, and the second orthogonal direction can be the Y direction.

According to the invention, there is provided a motor system for XY motion, namely compound orthogonal motion in a single plane. Angular movement of the shuttle is essentially restrained.

There is a first linear motor for effecting movement of a first movable element in a first of two orthogonal directions. A second linear motor is provided for movement of a second movable element of the second motor in a second of the orthogonal directions.

A base is provided for locating the first motor and the second motor relative to each other in a single plane so that the respective elements are movable in their respective orthogonal directions relative to each other over the base and in the single plane.

A shuttle is reactive with two elements such that movement of the elements effects XY movement of the shuttle.

At least one of the elements, or the shuttle, includes an air bearing relative to the base. In a preferred form of the invention, each of the elements includes an air bearing relative to the base and the shuttle additionally includes an air bearing relative to the base. Each of the elements operates with respect to feedback means for each linear motor so that as each element moves in its respective direction the motion of the element is precisely controlled by a positive feedback loop.

The elements interact with the shuttle so that as each element moves in its respective X or Y direction, the shuttle can be moved across the base in an XY direction as appropriate. The shuttle preferably interacts with each of the elements through an air bearing between the interface of the respective elements and the air bearing.

In one preferred form of the invention the shuttle and at least one of the motors is connected through air bearings. The air bearings acting to substantially balance the force attracting the motor and the shuttle and the force repelling the motor and the shuttle thereby providing an effective connection between the motor and the shuttle so that action of the motor permits for effective movement of the shuttle.

In another preferred form of the invention the shuttle and at least one of the motors are connected through air bearings creating a repelling force. A vacuum attracting force is created by a vacuum generating element, the air bearings acting to substantially balance the vacuum force thereby providing an effective connection between the motor and the shuttle so that action of the motor permits for effective movement of the shuttle.

In yet a further preferred form of the invention, the shuttle and at least one of the motors are connected through air bearings creating a repelling force. There is also a pair of roller engagement elements. The air bearings act to substantially balance the action of the engagement element thereby providing an effective connection between the motor and the shuttle so that action of the motor permits for effective movement of the shuttle.

In still a further preferred form of the invention, the shuttle and at least one of the motors are connected through a mechanical linkage. The action of the linkage provides an effective connection between the motor and the shuttle so that action of the motor permits for effective movement of the shuttle.

The invention is further described with reference to the accompanying drawings.

DRAWINGS

DESCRIPTION

Figure 1:
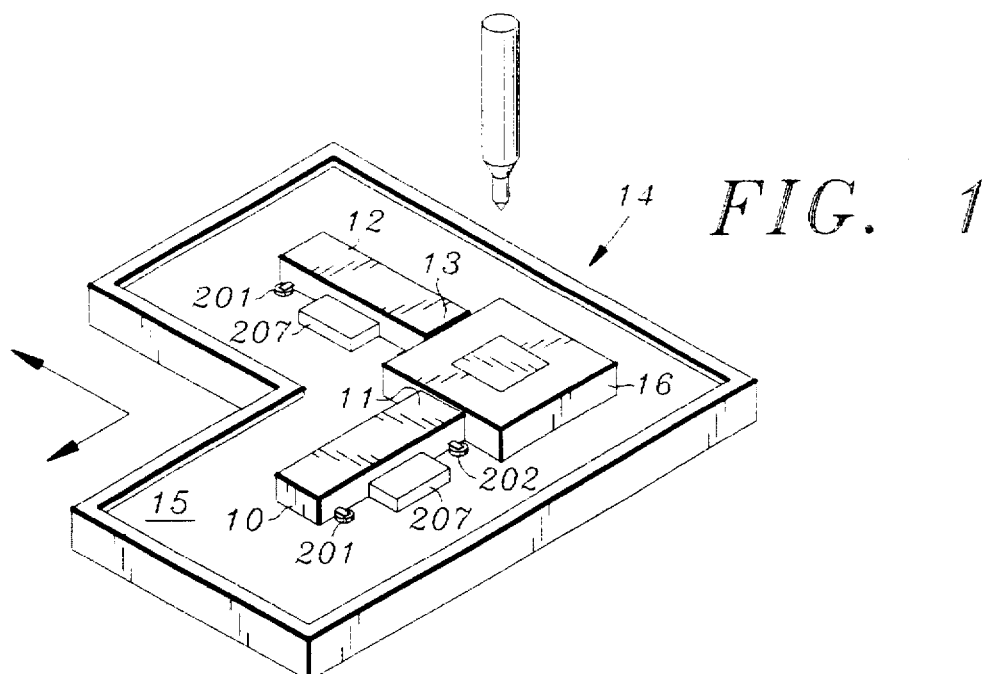
FIG. 1 is a perspective representation of a base with two orthogonally located linear motors on the base.

A linear motor system for providing XY motion, namely compound orthogonal motion comprises a first linear motor 10 directed for effecting movement of an element 11 in a first of two orthogonal directions, namely the X direction. A second motor 12 includes an element 13 directed in a second orthogonal direction, namely the Y direction. The motors 10 and 12 are mounted on a base element 14 so that the respective motors 10 and 12 operate in a single plane. The elements 11 and 13 thus move in their respective orthogonal directions X and Y respectively in a single plane over the surface or platform 15. The base element 14 includes a flat surface 15 which is preferably made of iron or some other magnetic material.

A shuttle 16 is capable of movement over the surface 15 under the interaction of the elements 11 and 13. The movement is in the XY plane, namely a compound orthogonal direction as required. Angular movement is avoided.

At least one of the elements 11 or 13 or the shuttle element 16 has an air bearing relative to the surface 15. In the arrangement illustrated, both the elements 11 and 13 and the shuttle 16 have air bearings relative to the surface 15.

Figure 3:
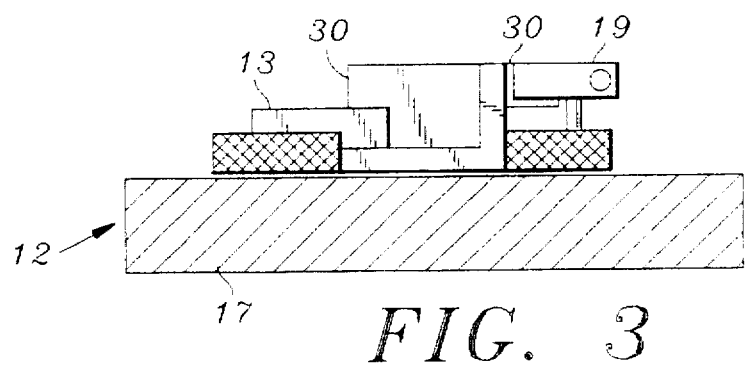
FIG. 3 is an end view of a linear motor.
Figure 4:
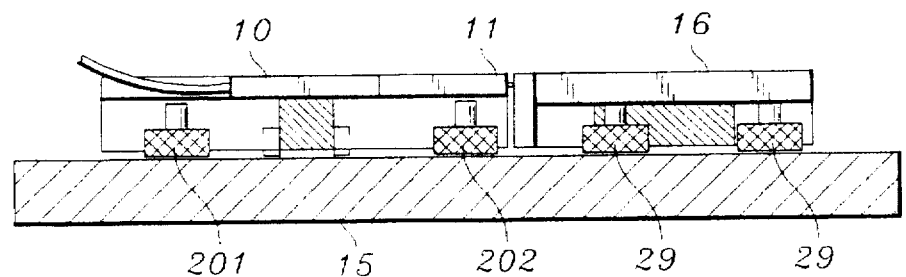
FIG. 4 is a side view of a linear motor in relationship to a shuttle mounted on a base.
Figure 2A:
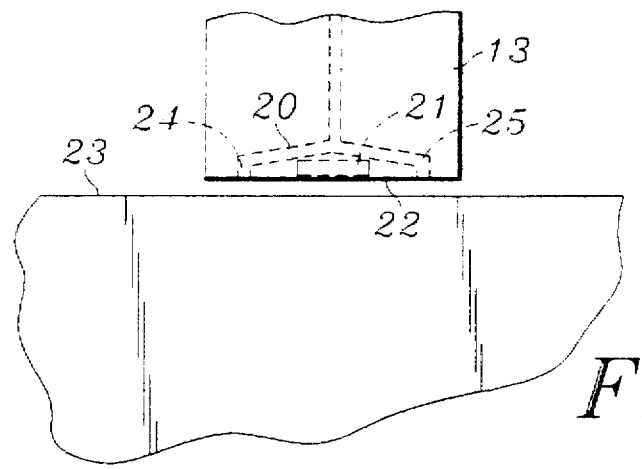
FIGS. 2 and 2a are a plan view illustrating two linear motors in relationship with a platen.
Figure 2:
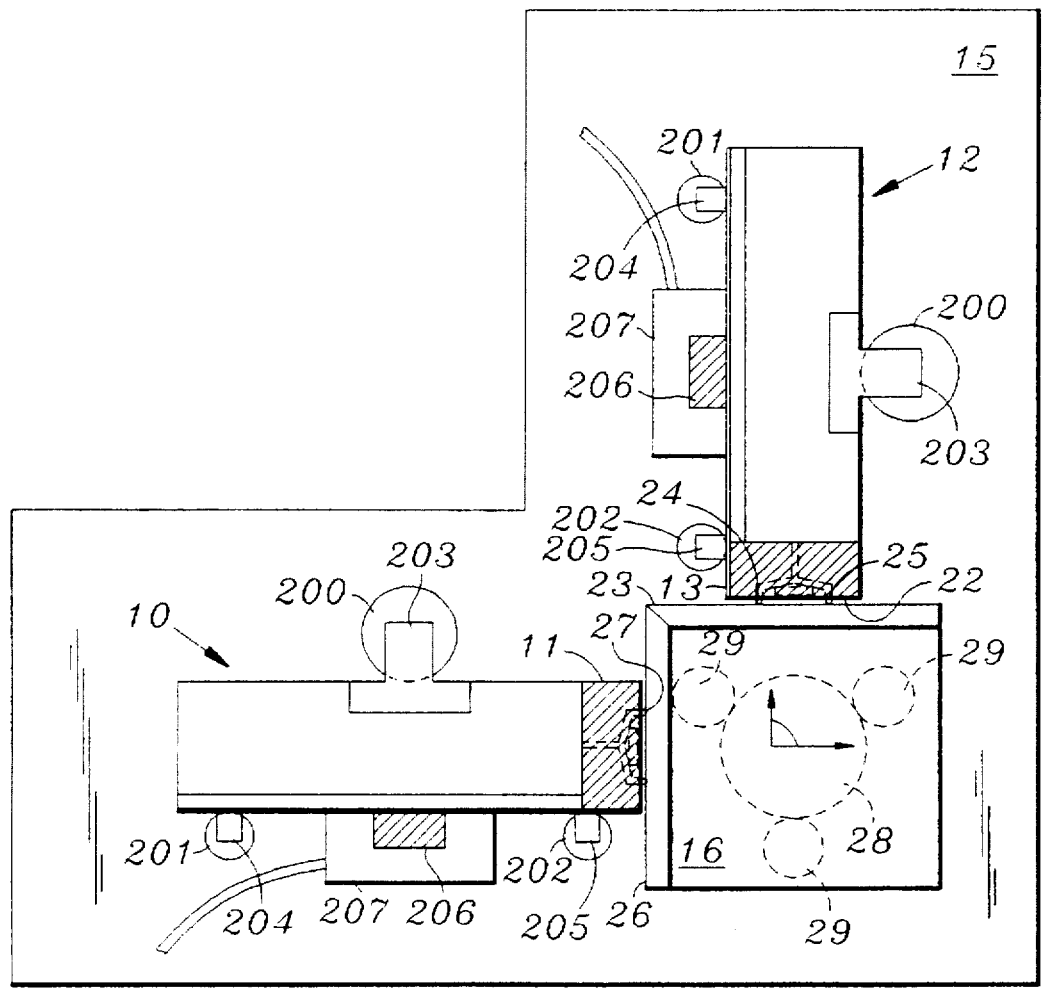

Each of the motors 10 and 12 is a linear motor including a feedback means to facilitate accurate movement of the elements 11 and 13, respectively. The motor 12 which is illustrated in FIG. 3 includes a motor primary or armature 17 which is built into part of the steel base plate constituting the surface 15. The element 13 which is movable is illustrated in FIG. 3 in the form of an element 18 which runs over an elongated armature which is stationary relative to the motor primary 17 of the motor 12. The element 18 is affixed at its leading end to the element 13.

There is an encoder head 19 with an encoder scale 30 located between the head 19 and the movable element 11 and 13, respectively. Each of the elements 11 and 13 are supported on three spaced air bearings 200, 201 and 202. These bearings are mounted with the elements 11 and 13 through arms 203, 204, and 205 respectively. There is also a lateral located magnetically preloaded air bearing 206 mounted in plate 207 which prevents the arms 11 and 13 from moving laterally sideways relative to the desired axially motion. The action of the magnetic preloaded air bearings are described further below.

In the head portion 20 of the element 13 there is a magnet 21 which acts as a preload to attract the shuttle 16 towards the interface 22 between the leading end of element 13 and the face 23 of the shuttle 16. There is also a pair of air bearing outlets 24 and 25 which act to repel the shuttle 16 from the face of the element 13. In this manner, the balancing between the magnetic attraction and the air repulsion acts to create an air bearing between the shuttle 16 and the leading end of the element 13. Suitable means is provided in or with the motor for generating the air pressure.

By having a pair of air bearings in the leading end of each of the elements 11 and 13, a balance is provided to the shuttle 16 so that angular movement as indicated by angle theta is limited. A fine tuning of the air pressure out of each of the inlets 24 and 25 would ensure that angular movement theta of the shuttle 16 is minimized and effectively prevented. The fine tuning is by having the outlet force from each respective outlet substantially equal. Any tendency to twist in an angular sense would be counteracted by changing the air pressure from the various air outlets of the elements 11 and 13.

A similar air bearing is developed on the interface between face 26 of the shuttle and face 27 of the element 11. Each of the elements 11 and 12 are themselves suspended on air bearings. This is effected by a similar balance between magnetic forces and air pressure forces between the element 18 and the armature 19. In this manner, the elements 11 and 13 can move under air bearing action longitudinally along the respective X and Y axis along which they are aligned.

Figure 9A:
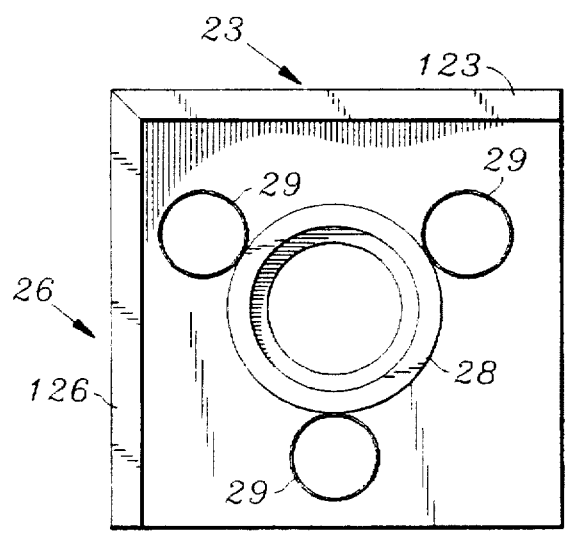
FIGS. 9a and 9b illustrate, respectively, the under plan view and a side view of a shuttle which shows the preload means and the air bearing pads.
Figure 9B:
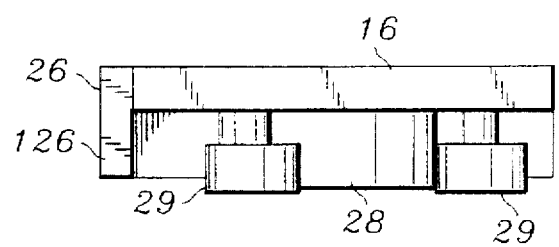

The shuttle 16 as illustrated in FIGS. 9a and 9b similarly has a magnet 28 which is diagrammatically illustrated at the center of the shuttle 16. This magnet 28 acts to cause a preload by magnetic attraction between the shuttle 16 and the surface 15. Similarly, the shuttle 16 has three air outlet pads 29 arranged strategically in a triangular relationship about the shuttle so that air can be forced downwardly towards the surface 15. This acts to lift the shuttle 16 from the surface 15. The balance between the magnetic attraction and the air repulsion acts to suspend the shuttle 16 on an air bearing on the surface 15. Suitable pressure generating means are provided for creating the air repulsion for the shuttle 16. Two adjacent sides 23 and 26 of the shuttle 16 provide steel elements 123 and 126, respectively, which permit for the magnetic interaction with the arms 11 and 13. The main body of the shuttle 16 is formed of a non-magnetic material, such as aluminum.

Figure 7:
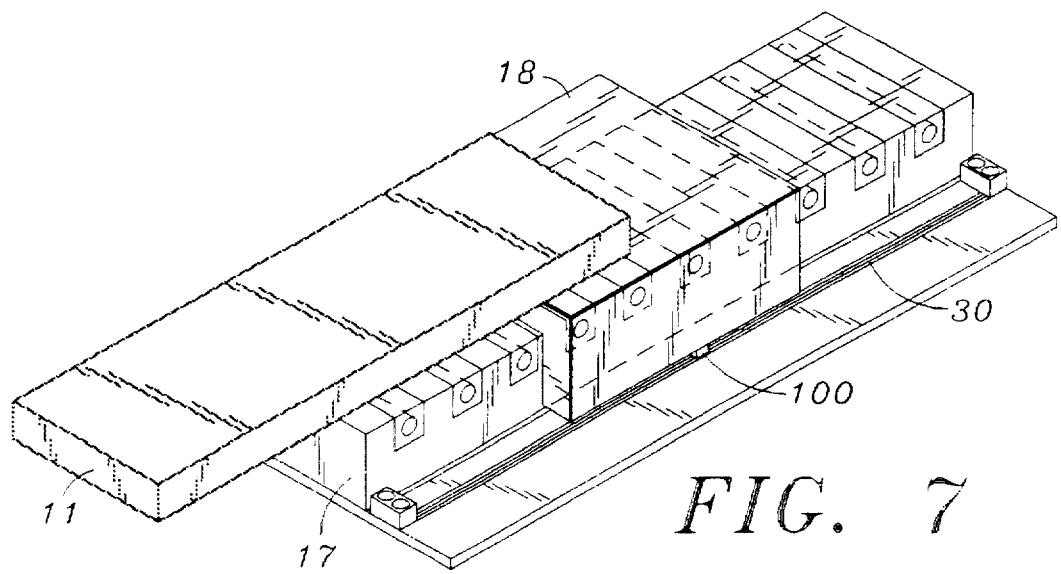
FIG. 7 is a perspective cross-sectional view of a linear DC motor.

Each of the linear motors are either DC motors or induction motors. As illustrated in another embodiment of a linear motor in FIG. 7, a feedback scale 30, which is a linear scale, is provided on the side of each of the motors. Thus, as a U-shaped element 18 moves forwardly and backwardly in a linear direction the precise location of the element 18 relative to the elongated armature 17 can be established.

The encoder feedback scale 30 can be defined by minute and discrete magnetic zones such that the interaction of the element 18 relative to these magnetic zones can be precisely regulated. A magnetic read head 100 is provided with the element 18 so that it interacts with the magnetic scale 30 of the encoder feedback means. The motion and position of the element 18 can thereby be definitively controlled.

In other forms of the invention, the read head 100 can be a laser means operable with interference elements running along the linear scale 30 of each of the motors.

Figure 5:
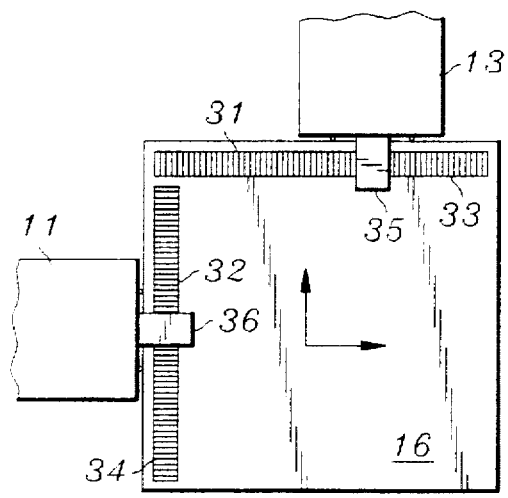
FIG. 5 is a diagrammatic view of an alternative arrangement of two linear motors in relationship to a shuttle using a different feedback means.

In a different embodiment of the invention as illustrated in FIG. 5, there are provided interference scales 31 and 32 on the shuttle 16. The scales 31 and 32 as illustrated show the fine gradations 33 and 34, respectively, which operate with the read heads 35 and 36 which are forwardly located relative to each of the respective elements 13 and 11. The nature of this arrangement is that as shuttle 16 is moved in an X direction, the scale 33 is operable. Thus, the element 11 operates with scale 33 through read head 35. As the shuttle moves in a Y direction, the read head 36 operates with scale 32. The motor with element 13 works with the read head 36 and element 32 which related to is both on the element 11 of the opposite motor.

The invention provides for very fine control of the shuttle 16 over the surface 15. The control is essentially equally as fine in control as the motion of each of the elements 11 and 13 for the respective motors in their linear operation.

Figure 6:
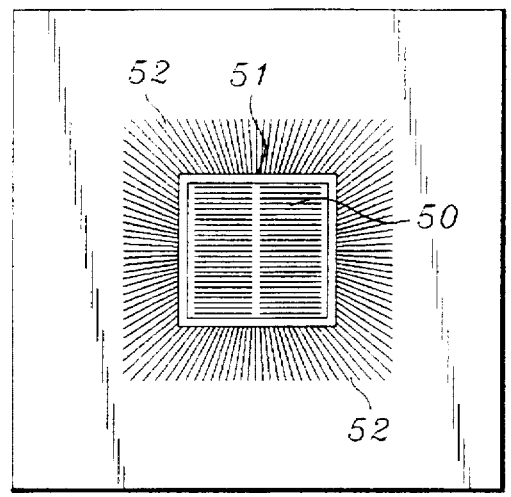
FIG. 6 is a plan representation of a chip with multiple wires to be bonded and is typical of a workpiece to be moved in an XY sense with precision.

As indicated in FIG. 6, there is a chip 50 which has multiple terminals 51 which need to be bonded with wires 52. When a chip 50 is mounted on top of the table, platen or shuttle 16, this location can be precisely determined such that wire bonding can be placed accurately relative to the terminals 52 and the positions about the chip 50. As chips 50 increase in density and more and more terminals need to be provided for precise bonding, it is increasingly important that the location of the chip 50 be precisely determined relative to a tool for affecting bonding or soldering as the case may be.

Figure 8:
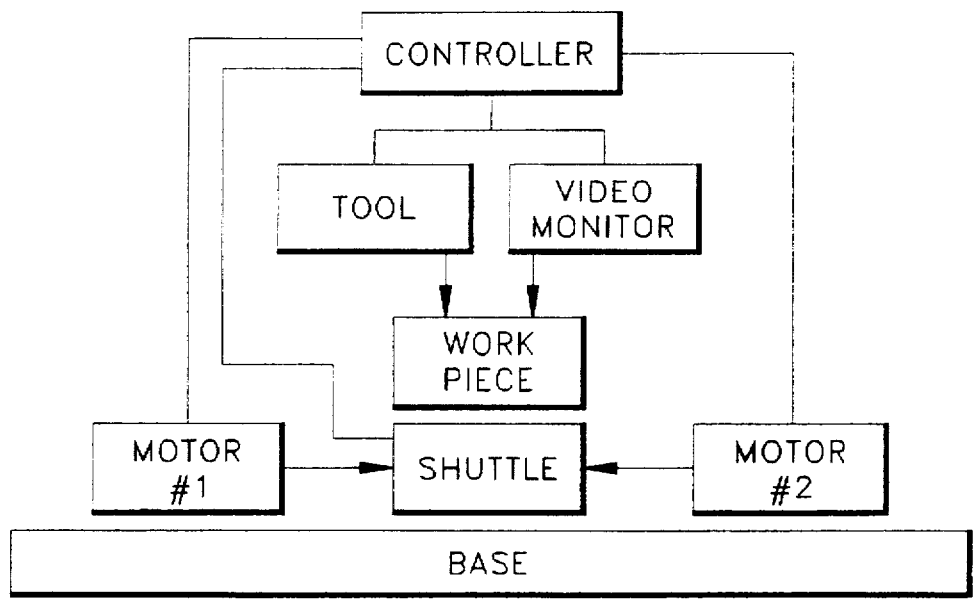
FIG. 8 is a working diagram of a system incorporating the motor system and using a workpiece with a tool.

In FIG. 8 there is illustrated a system for controlling the two motors, the shuttle, and the tool relative to a workpiece on the shuttle. A video monitor is also illustrated for visually being able to pictorially monitor the relationship of the workpiece and the tool. The controller can operate the different motors to effect the appropriate linear movement in the X and Y directions, respectively. Also, the controllers can regulate the operation of the air generating means for the shuttle and the motor to ensure the effective operation of the air bearings. The controller is computer operated to regulate the different operations of the elements of the apparatus.

The invention is directed to a system for providing the precise XY control of a shuttle so that different workpieces 50 can be located relative to tools and the like without angular movement. The invention is also directed to systems, apparatus and methods incorporating the motor system.

In one example of the invention the shuttle extends about 5 inches square in size. The breadth of each of the elements 11 and 13 inter-engaging with the shuttle interface is about 2 inches. The amount of travel in each of the X and Y axes of the motors is three inches.

Figure 11A:
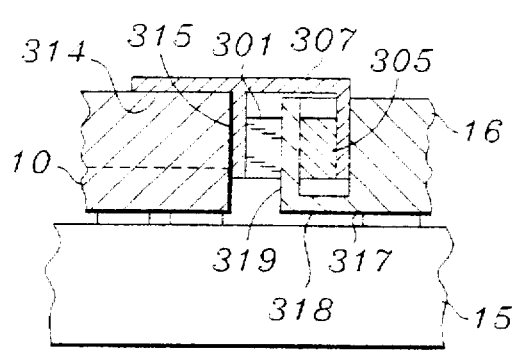
FIG. 11a is a sectional view through portion of the shuttle and motor along line 11a of FIG. 10 illustrating the connection between the motors and the shuttle.
Figure 11B:
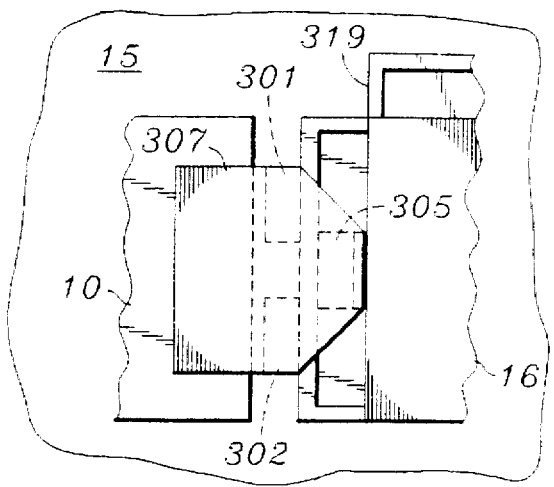
FIG. 11b is a top view of portion of the shuttle of FIG. 10 illustrating the connection between the motors and the shuttle.
Figure 10:
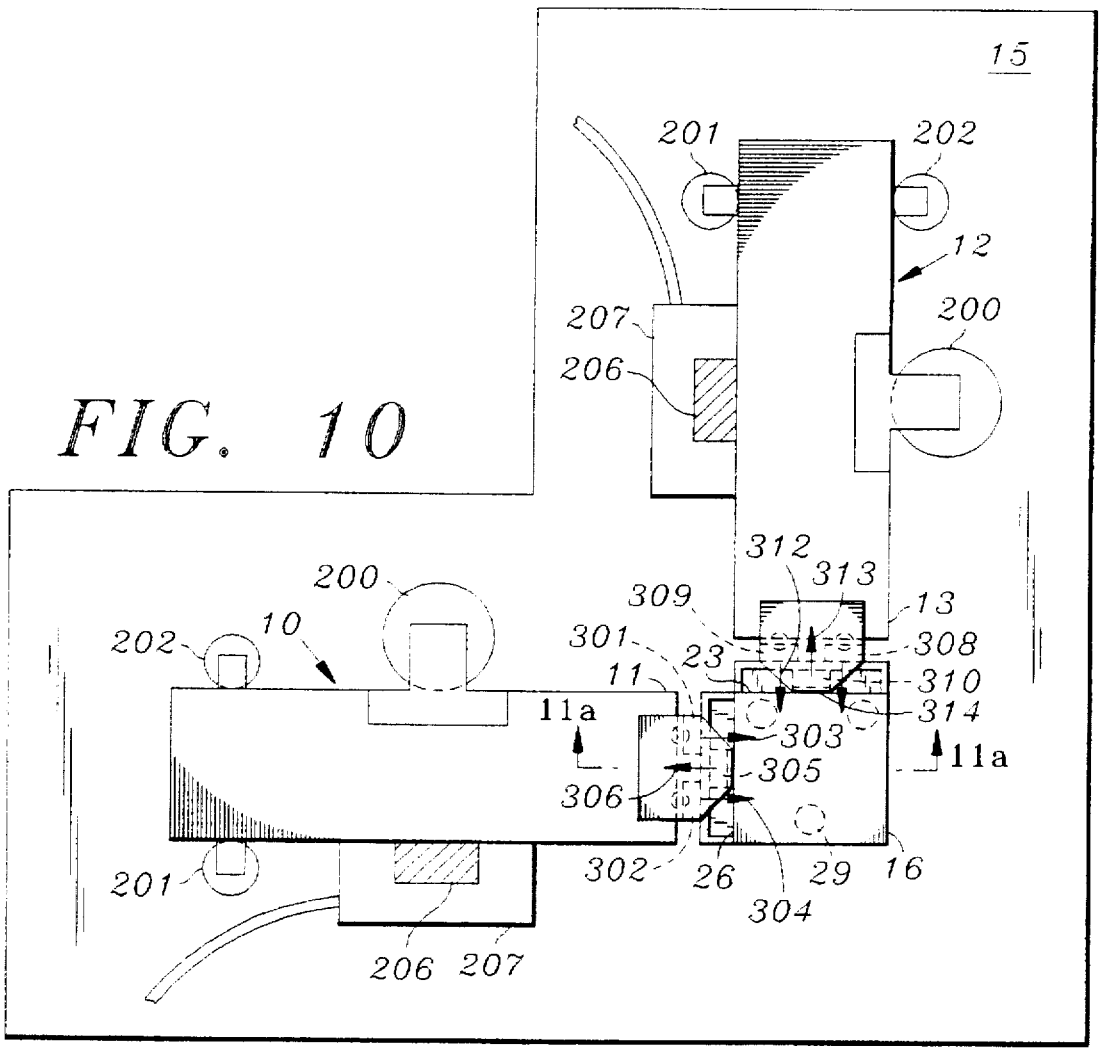
FIG. 10 is a plan view illustrating two linear motors in relationship with a shuttle wherein there are air bearings in opposition between the motors and the shuttle.

In FIGS. 10, 11a and 11b there is shuttle-motor relationship with the air bearings in opposition. Figuratively shown in FIG. 11a and 11b, there is an air bearing 301 and air bearing 302 which is at the head portion of the linear motor 10 which act as indicated by arrows 303 and 304 respectively to push the shuttle 16 away from the motor 10. Mounted in the shuttle 16, there is an air bearing 305 which acts to push the shuttle 10 away from the motor 11 as indicated in arrow 306.

The linear motor 12 has a similar bearing arrangement. There are air bearings 308 and 309 at the leading portion of the motor 12. An air bearing 310 in the shuttle 16 counteracts the effect of the bearings 308 and 309. Arrows 311 and 312 show the effect of bearings 308 and 309 respectively and arrow 313 shows the effect of the air bearing 310.

The air bearings 301, 302 and 305 are all connected mechanically through an arm 307 so that they can work physically in unison and with the air from each of the bearings 301, 302 and 305 are in balance. The physical interconnection between the bearings 308, 309 and 310 are also mechanically connected through an arm 307.

The arm 307 is connected with the top face of the shuttle 16 at 314, and is illustrated with reference to the motor 10 and the shuttle 16. At its forward end there are two downwardly directed prongs 315 and 316. Prong 315 mounts the air bearing 305 and prong 316 mounts the air bearings 301 and 302. At the bottom portion 317 of the shuttle there is an extending section 318 which has an upstanding lip 319 for fitting between the prongs 315 and 316. The air bearings 301, 302, and 303 interact with that lip 319 The arm element 307 has to physically connect the bearings 301, 302 and 305 in a mechanical manner and a manner such that the air passes between these bearings to effect an appropriate balance between the linear motor 10 and the shuttle 16.

A similar relationship exists in connecting the motor 12 with the shuttle 16. A similar arm and lip from the shuttle interact for operating bearings 310, 308, and 309 in counteraction to keep the shuttle 16 and motor 12 in an interactive moving relationship relative to each other.

Figure 17:
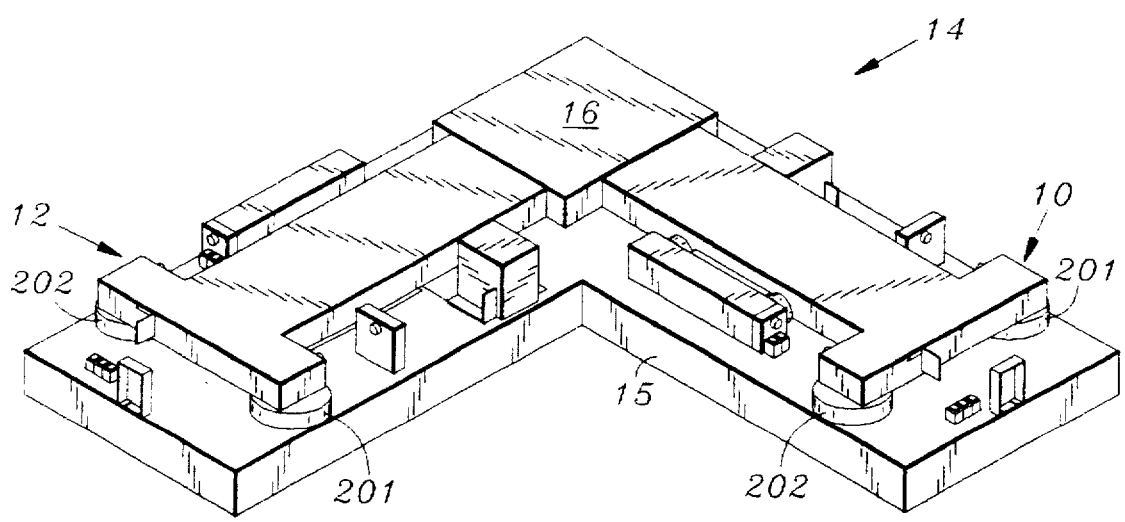
FIG. 17 is a perspective representation of a base with two orthogonally located linear motors on the base. The air bearings for the linear motors are arranged in accordance with the view of FIG. 10.

FIG. 17 shows a base with two orthogonally located linear motors on the base. The air bearings for the linear motors are arranged in accordance with the view of FIG. 10, namely to either side of the motors 10 and 11, and near the trailing ends of each of these motors.

Figure 12:
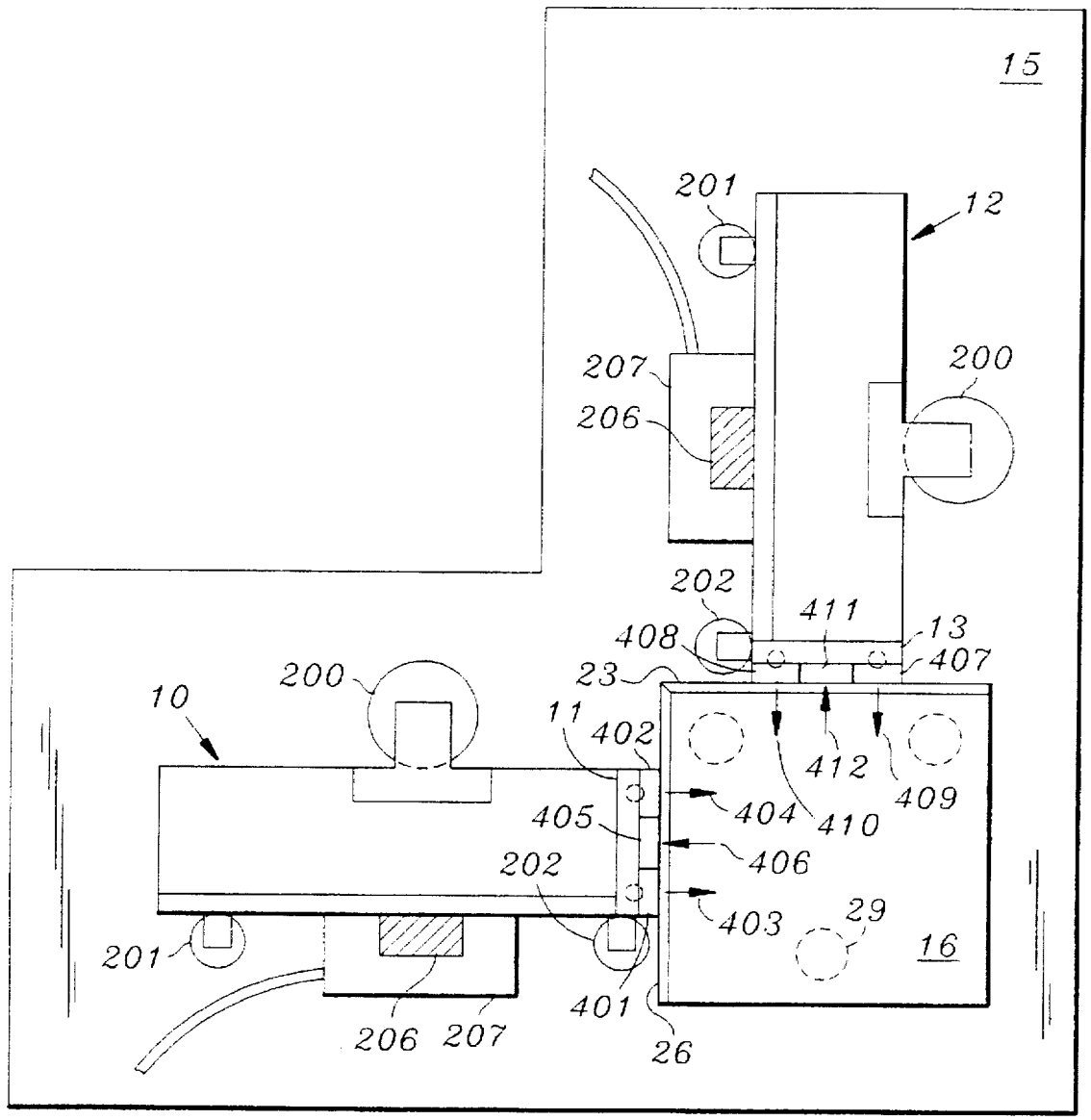
FIG. 12 is a plan view illustrating two linear motors in relationship with a shuttle wherein the motors and shuttle are connected with an air bearing vacuum relationship.

The relationship shown in FIG. 12 is one where there is an air bearing-vacuum connection between the shuttle 16 and the linear motors 10 and 12 respectively. The air bearings 401 and 402 are mounted at the forward end of the motor 10. The action of the air bearings is to urge the shuttle 16 away from the forward end of the motor 10 as is indicated by arrows 403 and 404 respectively. There is also a vacuum element 405 mounted at the head of the linear motor 10 which adds to draw the shuttle 10 towards the forward end of the linear motor 10. This is indicated by arrow 406. The balance between the air bearings 401 and 402 and a vacuum element 405 effectively anchors the shuttle 60 with the leading end of the motor 10.

In the second linear motor 12 there is an air bearing 407 and 408 at the leading end of the motor 12. These air bearings act to provide a force as indicated by arrows 409 and 410 to urge the shuttle 16 away from the leading end of the linear motor 12. There is a vacuum element 411 between the two air bearings 407 and 408 which acts to draw the shuttle 61 towards the leading end of the linear motor 12 as indicated by arrow 412. The air bearings 407 and 408 are in balance with vacuum element 411 so as to effectively anchor shuttle 16 with the leading end of the linear motor 12. As the shuttle 16 is required to move over the platen 15 the elements 11 and 13 respectively of each of the linear motors 10 and 12 would move forwardly or backwardly so as to cause the shuttle 16 to move as required.

Figure 13:
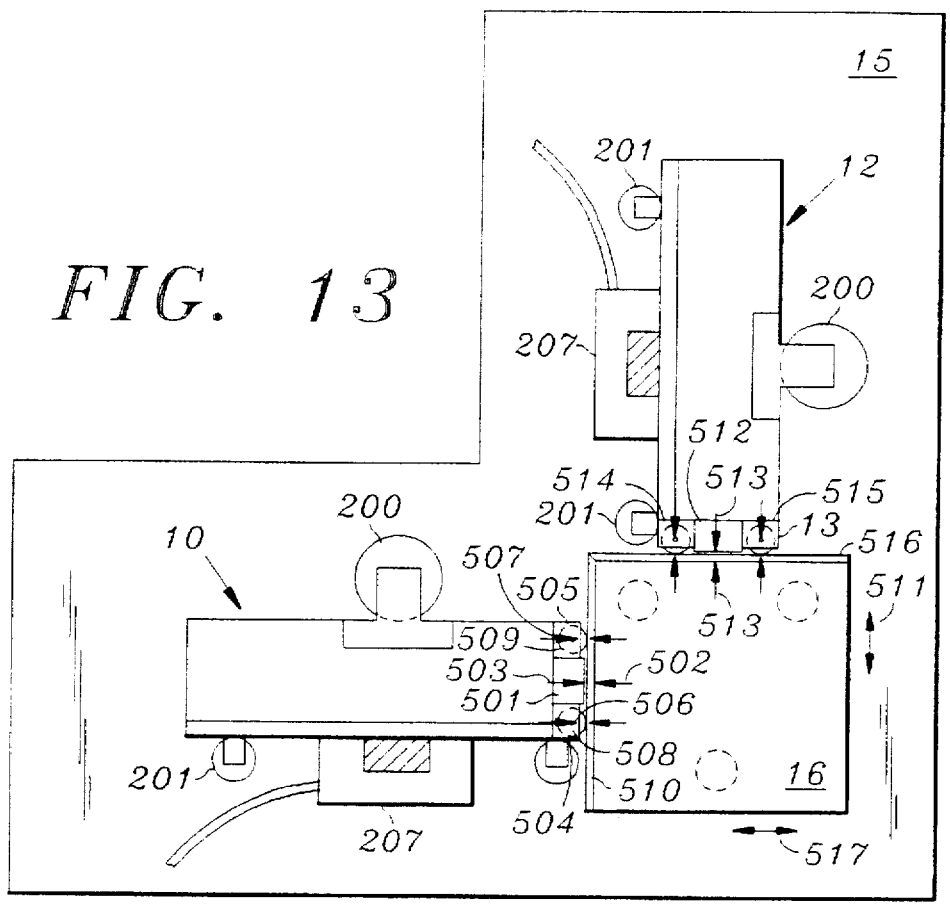
FIG. 13 is a plan view illustrating two linear motors in relationship with a shuttle, wherein the motors relate to the shuttle with a magnetic preload and engaging wheels.

As illustrated in FIG. 13 the relationship between the motor 10 and the shuttle 16 is caused by the interengagement of the magnetic preload and roller wheels. The magnetic preload for linear motor 10 is applied by element 501 which causes an attraction between the shuttle 16 and the head 11 of the motor 10 as indicated by arrows 502 and 503. There are a pair of wheels 504 and 505 to either side of the magnetic preload element 501. These wheels rolls respectively about axles 506 and 507. The free end of the wheels 508 and 509 engage the end phase 510 of the shuttle 10. The wheels act to prevent the locking effect which would be caused by the magnet 501 on the interface 510 of the shuttle 16. Thus, the magnet effect of the magnet 501 is in opposition to the rolling action of wheels 504 and 505 on the interface and this permits the shuttle 16 to move backwards and forwards as indicated by arrow 511.

The motor 12 has a similar arrangement and there is a magnetic element 512 at the head section 13 of the motor 12. This acts to create an attractive force as indicated by arrows 513. Two roller members 514 and 515 are arranged to either side of the magnetic element 513. They interact with the face 516 at the one end of the shuttle. The rollers 514 and 515 act in opposition to the magnetic effect of the magnetic element 512 and prevent a locking of the shuttle 16 with the head 13 of the motor 12. In this manner, it is permissible for the shuttle 16 to move as indicated by arrow 517.

In the arrangements shown in FIGS. 11a, 11b, 12 and 13, the shuttle 16 would have air bearings relative to the platen 15 so as to keep the shuttle 16 effectively levitated above platen 15 so as to permit movement of the shuttle 16 over the platen 15.

Figure 14:
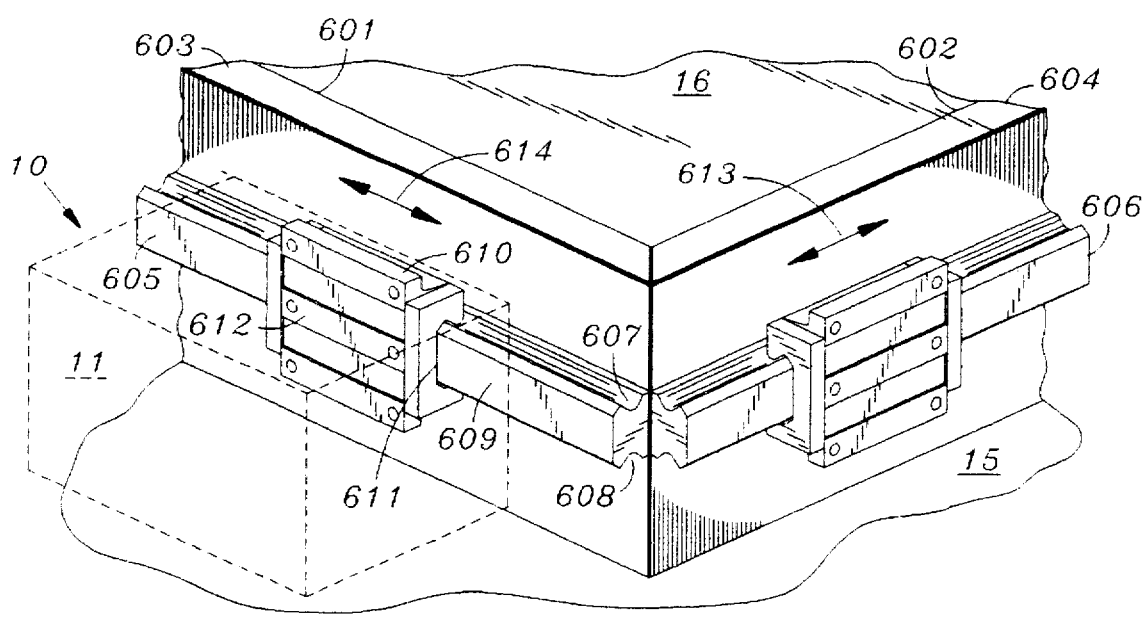
FIG. 14 is a partial perspective view illustrating an arrangement between the shuttle and two linear motors wherein there is a mechanical connection between the ends of the motors and the shuttle through a bearing mechanism riding respectively on a rail located on two adjacent sides of a shuttle.
Figure 15:
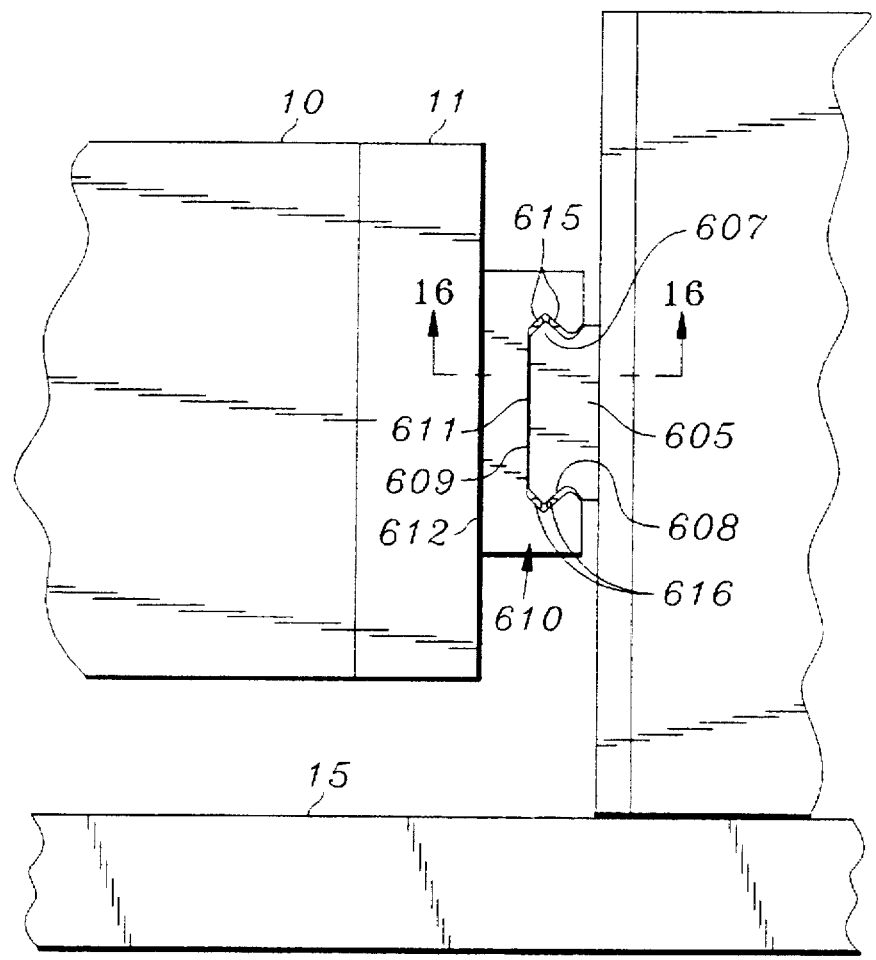
FIG. 15 is side view showing the end of the motor, the bearing and rail and shuttle in the working relationship.
Figure 16:
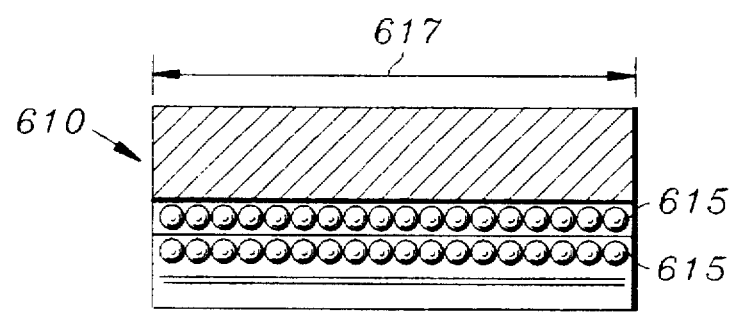
FIG. 16 is a cross-sectional view through the bearing, without the rail along line 16 of FIG. 15.

The arrangement shown in FIGS. 14, 15 and 16 could be different. It is possible that in such a situation the shuttle 16 would not have air bearings relative to the platen 15. In some situations there may still be an air bearing between the shuttle 16 and the platen 15.

On two adjacent ends 601 and 602 of the shuttle 16 there is mounted an edge rail 603 and 604 respectively. On the edge rail there is a further grooved rail 605 and 606 respectively. The grooved rail 5 and 606 include concave sections 607 and 608 with a flat face 609. A mating bearing 610 rides on the rail 605. A similar bearing rides on rail 606. The bearing has a mating cross-sectional portion 611 which rides between the flat rail portion 609 and the two concave portions 607 and 608 of the groove rail 605. The back face 612 of the bearing 610 is physically secured to the leading end 11 of the linear motor 10. Similarly, for motor 12 there is a bearing which has a face which engages the end 13 of the motor 12. In this manner, the motor 10 has a face 11 which through bearing 610 engages physically in anchoring relationship with the shuttle 16. The motor 12 has the forward end 13 which engages with a bearing in anchoring relationship with the grooved rails and the shuttle 16. In this manner the shuttle 16 is fixedly attached to each of the motors 10 and 12 of the system.

As the arm 11 moves forwardly or backwardly the bearing engaging with the groove 606 will move in the grooved rail 606 so the shuttle 16 can move forwardly or backwardly as indicated by arrow 613.

As the arm 13 of motor 12 moves backwardly or forwardly, the rail 605 would ride with the bearing 610 and the shuttle 16 can move backwardly or forwardly as indicated by the arrow 614. The bearing 610 has two pairs of roller races 615 and 616 respectively. These races 615 and 616 extend the length of the bearing 610 as indicated by arrow 617. They interact with the portion of the grooved rail 605 between the flat face 609 and the concave section 607 and 608 respectively. The bearing 610 interact with the rail 605 in a manner that the movement between the two elements is controlled very finely, to a few microns or less.

In different forms of the arrangement, it is possible to have a situation whereby the interface between the air bearings and magnets, or air bearings and vacuum force, or air bearings and engaging wheels are of a relationship such that instead of the air bearings being on the outside and the vacuum in the center, the situation could be different in that there could be a single air bearing in two vacuum elements on the outside of the vacuum element.

Similarly, there could be a single wheel element and two air bearings on either side of the wheel element. Likewise, there could be two air bearings on the shuttle and a single air bearing on the end of the motor element.

Many variations of the invention exist each differing from others in matters of detail only. Thus, the table, platen or shuttle 16 could be used to perform different functions for different operations of the motor system of the invention. Suitable mounting apparatus can be used with the system so that the location of the shuttle 16 can be monitored visually. The motor system can be incorporated into apparatus for working with different work pieces, which can require electronic, mechanical or other physical manipulation, work, observation or the like. Although the invention has been described with reference to linear motors, it is clear that other motors can be used. For instance, there may be other forms of electric motors, pneumatic or hydraulic motor systems. Also, although the preload has been described in the sense of a magnetic attraction, there can be a preload by a pneumatic vacuum force or other attraction force.

Although the relationship of the shuttle on the base has been described as being on an air bearing there could also be a suitable mechanical roller or ball bearing interaction between the shuttle and the base. Further, the shuttle can take different forms, for instance it may be a stage having a cross section and shape different to rectangular.

What is claimed is:

1. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and the shuttle and at least one of the motors being connected through air bearings, the air bearings acting to substantially balance the force attracting the motor and the shuttle and the force repelling the motor and the shuttle thereby providing an effective connection between the motor and the shuttle so that action of the motor permits for effective movement of the shuttle.

2. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and the shuttle and at least one of the motors being connected through air bearings creating a repelling force and a vacuum attracting force created by a vacuum generating element, the air bearings acting to substantially balance the vacuum force thereby providing an effective connection between the motor and the shuttle so that action of the motor permits for effective movement of the shuttle.

3. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, and the shuttle and at least one of the motors being connected through air bearings creating a repelling force and a roller engagement element, the air bearings acting to substantially balance the action of the engagement element thereby providing an effective connection between the motor and the shuttle so that action of the motor permits for effective movement of the shuttle.

4. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, the shuttle and at least one of the motors being connected through a mechanical linkage, the action of the linkage providing an effective connection between the motor and the shuttle so that action of the motor permits for effective movement of the shuttle, and wherein the mechanical linkage includes a linear rail and bushing means for engaging the rail to permit a sliding action between the rail and the bushing means in a direction transverse to the motive action of the connected motor.

5. A system as claimed in claim 1 wherein the shuttle has an air bearing and the motor has an air bearing.

6. A system as claimed in claim 5 wherein the shuttle air bearing and the motor air bearing are connected through an air connection.

7. A system as claimed in claim 5 wherein the shuttle and the motor are connected through a mechanical linkage.

8. A system as claimed in claim 2 wherein the motor has an air bearing and the vacuum generating element.

9. A system as claimed in claim 3 wherein the motor has an air bearing and the roller engagement element.

10. A system as claimed in claim 9 including a pair of roller engagement elements, one element of the pair being located to either side of the air bearing.

11. A system as claimed in claim 1 wherein at least one of the elements and the shuttle respectively have air bearings relative to the base.

12. A system as claimed in claim 11 wherein the rail includes a pair of linear tracks, and wherein there are bushings directed linearly on both the tracks.

13. A system as claimed in any one of claims 1 to 10, or 12 wherein the shuttle has an air bearing relative to the base.

14. A system as claimed in anyone of claims 1 to 4 wherein the first motor is a closed loop single axis motor, such closed loop motor including single axis feedback means for enhancing control of the movement of the element.

15. A system as claimed in anyone of claims 1 to 4 wherein both the first motor and the second motor are single axis closed loop motors, such closed loops including respective single axis feedback means for respectively enhancing control of the movement of the respective elements.

16. A system as claimed in claim 15 wherein the first motor is a linear motor, and the feedback means is effected by magnetic interaction between the element and a linear scale, the scale being part of the motor, and being directed substantially parallel to the movement of the element.

17. A system as claimed in claim 16 wherein the motors are linear motors, and the feedback means for each respective motor is effected by a magnetic interaction between a linear scale for each respective motor, the scale being substantially parallel to the movement for each respective element of each respective motor.

18. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, means for forming a bearing between each element of the respective motor and the shuttle, and preload means for attracting the interacting element and the shuttle, the bearing balancing the effect of the preload.

19. A system as claimed in claim 18 wherein at least one of the elements, and the shuttle respectively have a bearing force created selectively from the group of a vacuum attracting force cooperating with an air bearing repelling force, a magnetic attracting force cooperating with an air bearing repelling force, an air bearing repelling force in a first direction and an air bearing repelling force in an opposite direction, or a mechanical linkage.

20. A system as claimed in claim 18 wherein at least one of the elements or the shuttle respectively have an air bearing relative to the base, and including means for forming the air bearing by exerting an air pressure between respective interacting faces and the base, and including means for attracting the respective interacting faces and the base, the air pressure balancing the effect of the attraction.

21. A system as claimed in claim 19 wherein at least one of the elements or the shuttle respectively have an air bearing relative to the base, and including means for forming the air bearing by exerting an air pressure between respective interacting faces and the base, and including means for attracting the respective interacting faces and the base, the air pressure balancing the effect of the attraction.

22. A motor system for generating compound orthogonal motion comprising:

a first motor directed for effecting movement of a first element in a first of two orthogonal directions, a second motor directed for effecting movement of a second element in the second of the orthogonal directions, a base for locating the first motor and second motor relative to each other so that the elements are movable in a single plane in their respective orthogonal directions relative to each other and over the base, a shuttle reactive with the two elements such that movement of the elements effects compound orthogonal movement of the shuttle, at least two bearings between each face of each element and the shuttle such that angular movement of the shuttle relative to the elements is restrained at least one of the elements, and the interface between the shuttle and the respective elements respectively have a bearing force created selectively from the group of a vacuum attracting force cooperating with an air bearing repelling force, a magnetic attracting force cooperating with an air bearing repelling force, an air bearing repelling force in a first direction and an air bearing repelling force in an opposite direction, or a mechanical linkage.

23. A system as claimed in claim 22 wherein at least one of the elements, or the shuttle have bearings relative to the base, and including at least bearings between each face of each element and the shuttle such that angular movement of the shuttle relative to the elements is restrained.

24. A system as claimed in anyone of claims 1 to 4 wherein the motors are selected to be a DC linear motor.

* * * * *